US010104106B2

(12) United States Patent
Langton et al.

(10) Patent No.: US 10,104,106 B2
(45) Date of Patent: Oct. 16, 2018

(54) DETERMINING INTERNET-BASED OBJECT INFORMATION USING PUBLIC INTERNET SEARCH

(71) Applicant: Juniper Networks, Inc., Sunnyvale, CA (US)

(72) Inventors: Jacob Asher Langton, Oakland, CA (US); Zhenxin Zhan, Fremont, CA (US); Daniel J. Quinlan, San Francisco, CA (US); Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 129 days.

(21) Appl. No.: 14/674,122

(22) Filed: Mar. 31, 2015

(65) Prior Publication Data

US 2016/0294857 A1    Oct. 6, 2016

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |
| *G06F 17/30* | (2006.01) | |

(52) U.S. Cl.
CPC .... *H04L 63/1425* (2013.01); *G06F 17/30864* (2013.01); *G06F 17/30867* (2013.01); *H04L 63/14* (2013.01)

(58) Field of Classification Search
USPC .................................................. 726/22–25
See application file for complete search history.

(56) References Cited

U.S. PATENT DOCUMENTS

| | | | | |
|---|---|---|---|---|
| 6,721,721 | B1 * | 4/2004 | Bates | G06F 21/562 |
| 7,739,211 | B2 * | 6/2010 | Coffman | G06Q 30/02 |
| | | | | 706/45 |
| 7,761,912 | B2 * | 7/2010 | Yee | H04L 63/0263 |
| | | | | 726/11 |

(Continued)

OTHER PUBLICATIONS

Teufl et al., "Malware detection by applying knowledge discovery processes to application metadata on the Android Market (Google Play)", Security and communication networks, Jan. 18, 2013, XP-002761001, 31 pages.
Extended European Search Report corresponding to EP15186513.6, dated Sep. 7, 2016, 6 pages.

*Primary Examiner* — Christopher Revak
*Assistant Examiner* — Vadim Savenkov
(74) *Attorney, Agent, or Firm* — Harrity & Harrity, LLP

(57) ABSTRACT

A device may receive an object. The device may determine object information for the object. The device may cause an internet search, based on the object information, to be performed to determine Internet search results. The object information may be provided as one or more Internet search queries for the Internet search. The device may receive the Internet search results based on causing the Internet search to be performed. The Internet search results may be related to the object information. The device may analyze the Internet search results to determine Internet-based object information. The device may store or provide the Internet-based object information to permit a determination as to whether the object is malicious.

20 Claims, 8 Drawing Sheets

(56) References Cited

U.S. PATENT DOCUMENTS

| | | | | |
|---|---|---|---|---|
| 7,991,726 B2* | 8/2011 | Zhou | .................... | H04L 63/1416 |
| | | | | 706/47 |
| 8,234,706 B2* | 7/2012 | Zhang | .................... | G06Q 10/00 |
| | | | | 707/706 |
| 8,359,651 B1 | 1/2013 | Wu et al. | | |
| 8,806,644 B1* | 8/2014 | McCorkendale | ... | H04L 63/1416 |
| | | | | 713/188 |
| 8,856,937 B1* | 10/2014 | Wuest | ................ | H04L 63/1483 |
| | | | | 713/188 |
| 9,251,221 B1* | 2/2016 | Murphey | ............ | G06F 17/3053 |
| 2003/0070088 A1* | 4/2003 | Gryaznov | ............... | G06F 21/56 |
| | | | | 726/4 |
| 2009/0013041 A1* | 1/2009 | Farmer | .................. | G06Q 10/06 |
| | | | | 709/204 |
| 2009/0126023 A1* | 5/2009 | Yun | .................... | H04L 63/1433 |
| | | | | 726/25 |
| 2010/0037314 A1* | 2/2010 | Perdisci | .............. | H04L 63/1416 |
| | | | | 726/22 |
| 2010/0082513 A1* | 4/2010 | Liu | .................... | H04L 63/1458 |
| | | | | 706/46 |
| 2010/0186088 A1* | 7/2010 | Banerjee | ................ | G06F 21/51 |
| | | | | 726/23 |
| 2011/0083180 A1* | 4/2011 | Mashevsky | ............ | G06F 21/55 |
| | | | | 726/23 |
| 2012/0240236 A1* | 9/2012 | Wyatt | .................... | G06F 21/564 |
| | | | | 726/25 |
| 2013/0227683 A1 | 8/2013 | Betteni et al. | | |

* cited by examiner

DETERMINING INTERNET-BASED OBJECT INFORMATION USING PUBLIC INTERNET SEARCH

BACKGROUND

An object (e.g., a file, a document, an executable, etc.) may include object content, such as words, phrases, strings, or the like. The object may also include object metadata that describes the object, such as a date of publication, an author, a description, or the like. Some objects may be malicious and may perform undesired actions.

SUMMARY

According to some possible implementations, a device may include one or more processors. The one or more processors may receive an object. The one or more processors may determine object information for the object. The one or more processors may cause an internet search, based on the object information, to be performed to determine Internet search results. The object information may be provided as one or more Internet search queries for the Internet search. The one or more processors may receive the Internet search results based on causing the Internet search to be performed. The Internet search results may be related to the object information. The one or more processors may analyze the Internet search results to determine Internet-based object information. The one or more processors may store or provide the Internet-based object information to permit a determination as to whether the object is malicious.

According to some possible implementations, a computer-readable medium may store one or more instructions that, when executed by one or more processors, cause the one or more processors to receive an object for determination of object content. The object content may be included in the object. The one or more instructions may cause the one or more processors to determine the object content for the object. The one or more instructions may cause the one or more processors to process the object content to generate a plurality of Internet search queries. The one or more instructions may cause the one or more processors to submit the plurality of Internet search queries to a search engine device. The one or more instructions may cause the one or more processors to receive, from the search engine device, a plurality of Internet search results based on the plurality of Internet search queries. The one or more instructions may cause the one or more processors to analyze the plurality of Internet search results to determine Internet-based object information. The one or more instructions may cause the one or more processors to store or provide the Internet-based object information to permit a determination as to whether the object is malicious.

According to some possible implementations, a method may include receiving, by a device, an object for processing to determine Internet-based object information. The method may include determining, by the device and for the object, object information. The object information may be included in or describe the object. The method may include generating, by the device, Internet search queries based on the object information. The method may include causing, by the device and based on the Internet search queries, an Internet search to be performed to determine search results. The method may include analyzing, by the device, the search results to determine Internet-based object information. The method may include determining, by the device and based on the Internet-based object information, whether the object is malicious.

DETAILED DESCRIPTION

The following detailed description of example implementations refers to the accompanying drawings. The same reference numbers in different drawings may identify the same or similar elements.

A network service provider may want to determine information related to an object (e.g., a file entering a network associated with the network service provider, a file on a device connected to the network, an executable file, or the like). The object may include object content (e.g., strings, phrases, sentences, error messages, dialog boxes, window titles, names, web addresses, network addresses, etc.) and object metadata (e.g., information that describes the object, such as a publisher of the object, a date of publication of the object, an object type, an operating system, a description of the object, a version identifier associated with the object, etc.). The network service provider may maintain and/or access a private database to determine information, related to objects, that may be used, for example, to determine whether the objects appear to be malicious. However, the private database may be inadequate to determine the information. For example, the object may be too new, too obscure, etc. to be included in the private database. Further, the private database may rely on a particular entity to update the database, which may cause the private database to be prone to error and omission.

Implementations described herein may assist the network service provider in determining information related to an object using a public Internet search, rather than (or in addition to) a private database search. A network security device may receive the object, and may determine object content and object metadata from the object. The network security device may provide the object content and/or the object metadata to a search engine device as Internet search terms. Based on the Internet search terms, the network security device may receive Internet search results that describe publicly available webpages, documents, or the like. The network security device may analyze the Internet search results to determine Internet-based object information that describes the object. The network security device may provide and/or store the Internet-based object information (e.g., with other information related to the object, as part of a database of information related to objects, or the like). In this way, the network security device may determine object information from the Internet, which covers a broader range of objects than any private database, frequently provides information related to new (e.g., recent) objects, incorporates information provided by members of the public, and which may provide additional insight into sources, publishers, intended uses, etc. of the object.

Figure 1:
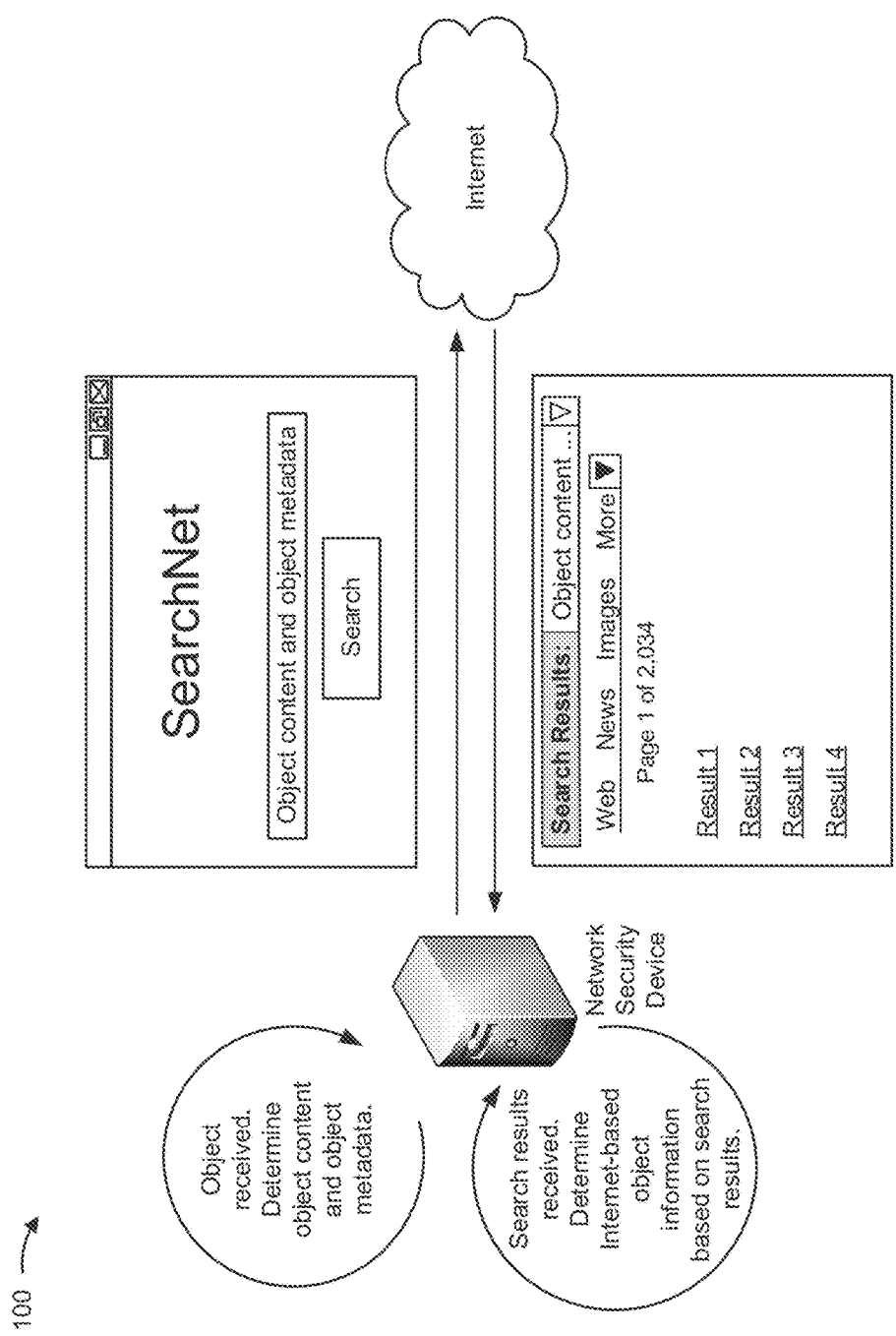
FIG. 1 is a diagram of an overview of an example implementation described herein.

FIG. 1 is a diagram of an overview of an example implementation 100 described herein. As shown in FIG. 1, assume that a network security device receives an object. Assume further that the object includes object content and object metadata. As shown, the network security device may determine the object content and the object metadata from the object. As further shown, assume that the network security device provides the object content and the object metadata to an Internet search engine (e.g., by providing different strings, phrases, etc. as different search terms, or the like). As shown, the network security device may receive Internet search results based on the Internet search engine performing a search based on the object content and metadata. As further shown, the network security device may determine Internet-based object information based on the Internet search results. The Internet-based object information may include information related to an age of the object, an origin of the object, a reputation of websites associated with the object (e.g., malware websites, adware websites, social media websites, blog websites, etc.), a measure of popularity of websites associated with the object (e.g., based on pageviews, other linking websites, search result rankings, or the like), forum discussions of the object (e.g., a number of posts in the forum discussions, topics of the forum discussions, etc.), or the like. The network security device, or another device, may use the Internet-based object information to determine whether the object is malicious, a type of the object, or the like.

In this way, the network security device may compile Internet search results based on object content and object metadata. The Internet search results may provide information that may be unavailable in private databases due to age, obscurity, or the like. The network security device may analyze the Internet search results to determine Internet-based object information, which may aid the network security device and/or a network service provider, associated with the network security device, in classifying and/or monitoring the object (e.g., to determine whether the object is malicious).

Figure 2:
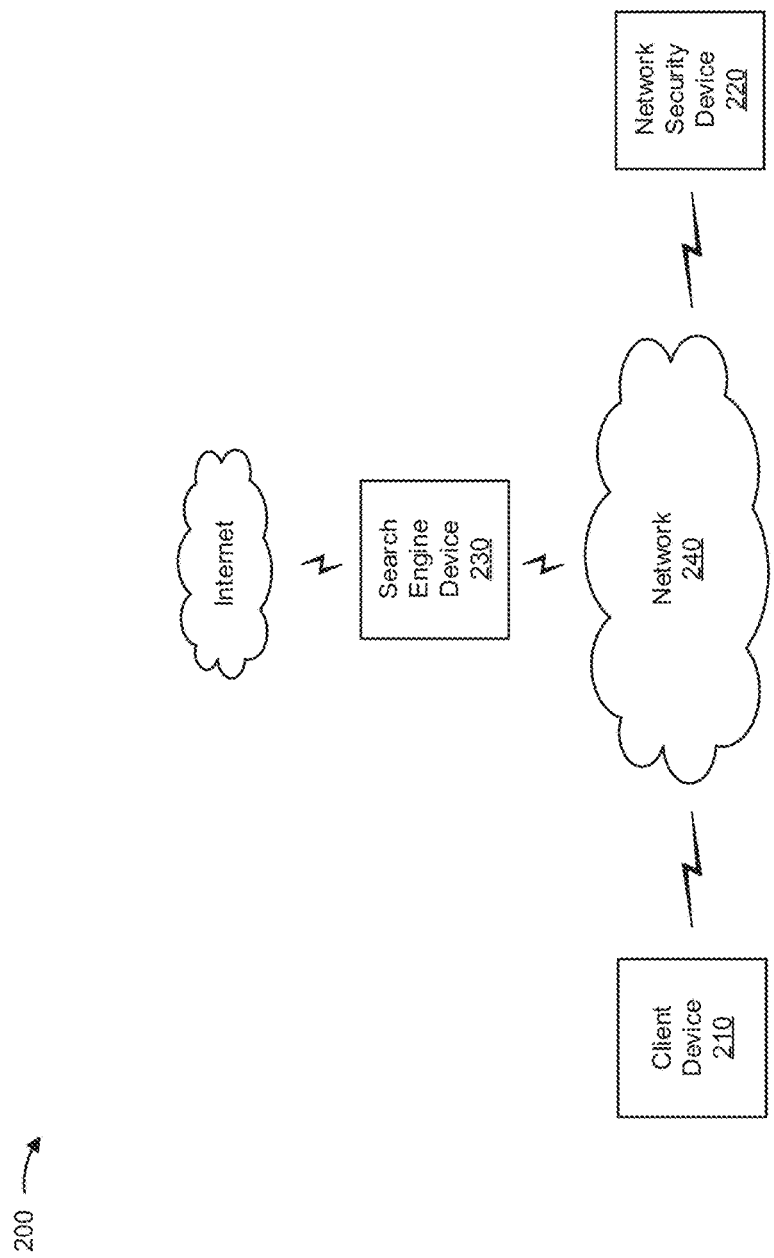
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network security device 220, a search engine device 230, and a network 240. Devices of environment 200 may interconnect via wired connections, wireless connections, or a combination of wired and wireless connections.

Client device 210 may include one or more devices capable of receiving, generating, storing, processing, and/or providing information. For example, client device 210 may include a communication and/or computing device, such as a mobile phone (e.g., a smart phone, a radiotelephone, etc.), a laptop computer, a tablet computer, a handheld computer, a gaming device, or a similar type of device. In some implementations, client device 210 may receive information from and/or transmit information to another device in environment 200. For example, client device 210 may receive an object from and/or provide an object to network security device 220 (e.g., for Internet-based analysis). In some implementations, client device 210 may receive, generate, store, process, and/or provide Internet-based object information (e.g., Internet-based object information generated by client device 210, by network security device 220, or by another device). In some implementations, client device 210 may be capable of executing, running, opening, parsing, and/or reading an object (e.g., to determine object content and/or object metadata from the object).

Network security device 220 may include one or more devices capable of receiving, generating, storing, processing, and/or providing an object and/or information related to an object. For example, network security device 220 may include a computing device, such as a server, a mobile phone (e.g., a smart phone, a radiotelephone, etc.), a laptop computer, a tablet computer, a handheld computer, or a similar device. In some implementations, network security device 220 may include a network device, such as a gateway, a firewall, a hub, a router, or a similar device. Network security device 220 may receive an object (e.g., an object destined for client device 210, an object provided by client device 210, or the like). Network security device 220 may determine object content and/or object metadata from the object. In some implementations, network security device 220 may provide the object content and/or the object metadata to an Internet search engine (e.g., for an Internet search based on the object content and/or object metadata). Network security device 220 may store and/or provide Internet-based object information (e.g., to client device 210 or to another device). In some implementations, network security device 220 may determine whether an object is malicious based on Internet-based object information, and/or may provide the Internet-based object information to another device (e.g., for the other device to use to determine whether the object is malicious).

Search engine device 230 may include one or more devices capable of receiving, generating, storing, processing, and/or providing Internet search queries and/or Internet search results. For example, search engine device 230 may include a server, or a similar device. Search engine device 230 may receive Internet search queries from network security device 220 or another device, and may determine Internet search results (e.g., Internet documents relevant to the Internet search queries) by searching the Internet based on the Internet search queries. Search engine device 230 may generate a ranked list of the Internet search results (e.g., based on a ranking algorithm) and may provide the ranked list of the Internet search results to network security device 220 or another device.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
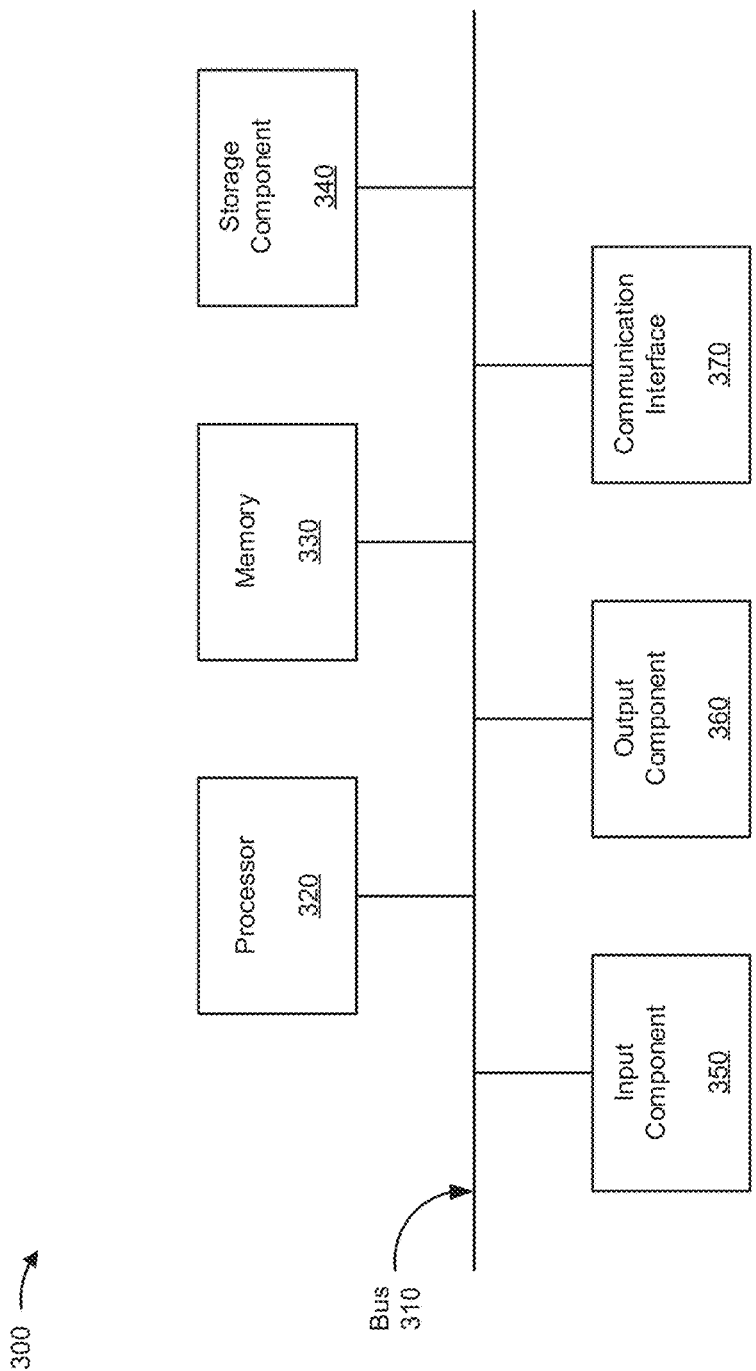
FIG. 3 is a diagram of example components of one or more devices of FIG. 2.

FIG. 3 is a diagram of example components of a device 300. Device 300 may correspond to client device 210, network security device 220, and/or search engine device 230. In some implementations, client device 210, network security device 220, and/or search engine device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
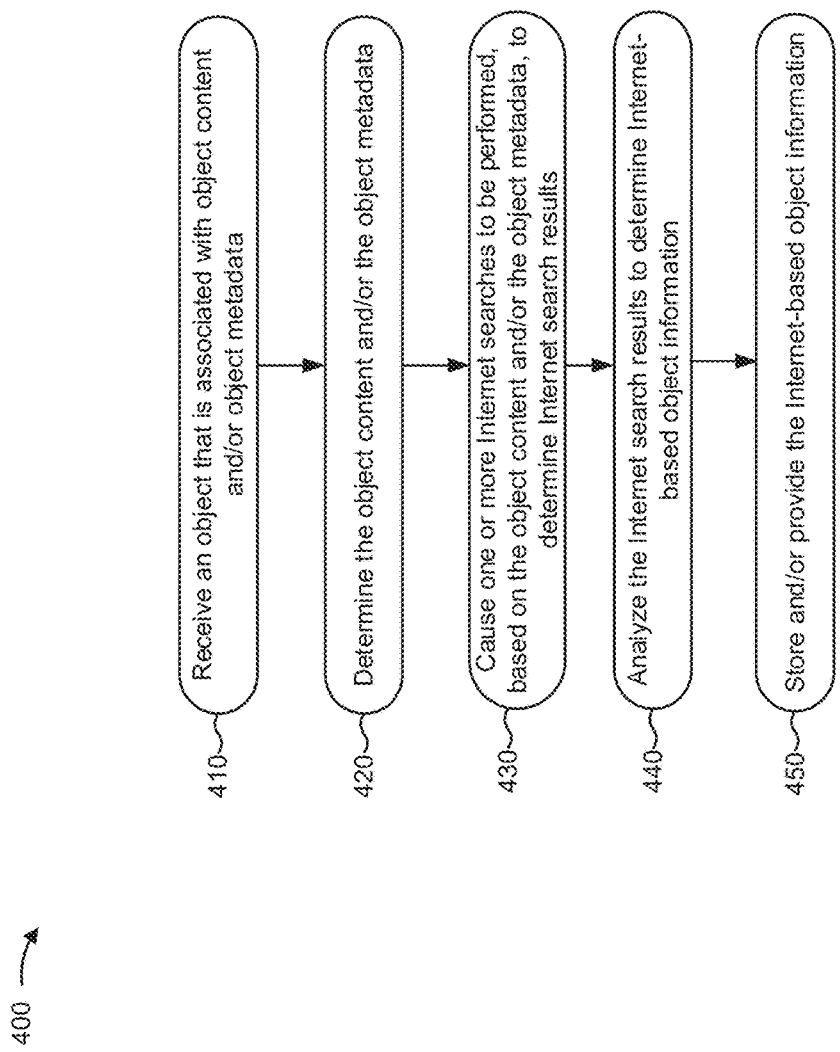
FIG. 4 is a flow chart of an example process for determining Internet-based object information based on object content and/or object metadata.

FIG. 4 is a flow chart of an example process 400 for determining Internet-based object information based on object content and/or object metadata. In some implementations, one or more process blocks of FIG. 4 may be performed by network security device 220. In some implementations, one or more process blocks of FIG. 4 may be performed by another device or a set of devices separate from or including network security device 220, such as client device 210 and/or search engine device 230.

As shown in FIG. 4, process 400 may include receiving an object that is associated with object content and/or object metadata (block 410). For example, network security device 220 may receive an object that is associated with object content and/or object metadata. In some implementations, network security device 220 may receive the object from client device 210 (e.g., based on client device 210 detecting a potential threat associated with the object, based on client device 210 providing the object automatically without user input, based on client device 210 receiving a user input to provide the object, or the like). In some implementations, network security device 220 may receive an object destined for client device 210. For example, network security device 220 may act as a gateway and/or firewall for client device 210, and may intercept the object en route to client device 210. Network security device 220 may use the object content and/or the object metadata to determine Internet-based object information that describes the object, which may aid network security device 220 in determining a risk level, an origin, or other information related to the object.

An object may include an executable file (e.g., a Windows executable file (EXE), a Windows script file (WSF), etc.), a web page object (e.g., a hypertext markup language (HTML) document, etc.), a text object (e.g., a Microsoft Word document (DOC), a plain text file (TXT)), a page layout object (e.g., a portable document format file (PDF), a picture file (PCT)), a compressed object (e.g., a zipped file (ZIP), a WinRAR compressed archive (RAR), etc.), or another type of object.

The object content may include one or more characters, strings, phrases, sentences, or the like, that may be stored in and/or referenced by the object. For example, the object content may include a title bar of a window included in the object, an error message included in and/or provided by the object, a text document included in the object, an image and/or a description of the image included in the object, an audio object (e.g., a transcription of the audio object, information associated with the audio object, or the like), a network address (e.g., an Internet Protocol (IP) address, or the like, that is included in the object and/or that is contacted by the object upon execution), a web address (e.g., that is included in the object and/or that is contacted by the object upon execution), or the like. The object metadata may include information that describes the object. For example, the object metadata may include information that describes a time and/or date of creation, an author, a publisher, a location of creation, a network address and/or domain name associated with the location of creation, a description of the object, a version of the object, or the like.

As further shown in FIG. 4, process 400 may include determining the object content and/or the object metadata (block 420). For example, network security device 220 may determine the object content and/or the object metadata. Network security device 220 may determine the object content and/or the object metadata to search the Internet for Internet search results for determining Internet-based object information. In some implementations, another device (e.g., client device 210, or the like) may determine the object content and/or the object metadata.

In some implementations, network security device 220 may perform a static analysis to determine the object content and/or the object metadata from an inert object (e.g., without executing and/or opening the object). For example, network security device 220 may perform a static analysis by parsing, examining, and/or reading the object. In some implementations, network security device 220 may attempt to determine object content information and/or object metadata from the inert object based on an object type. For example, if an object is a suspicious executable, network security device 220 may not execute the suspicious executable (e.g., for security reasons), and may attempt to determine the object content and/or the object metadata by performing a static analysis. Additionally, or alternatively, network security device 220 may attempt to determine the object content and/or the object metadata from an inert object if network security device 220 detects that the object is unencrypted. In this way, network security device 220 may attempt to determine object content and/or object metadata from an inert object, which may improve security and/or allow network security device 220 to determine Internet-based object information without executing and/or opening the object.

In some implementations, network security device 220 may determine the object content and/or the object metadata by opening and/or executing the object. For example, assume that network security device 220 fails to determine object content and/or object metadata from an inert object (e.g., based on the inert object being encrypted, obfuscated, or the like). In that case, network security device 220 may open and/or execute the object. Network security device 220 may determine the object content and/or the object metadata after opening and/or executing the object. For example, network security device 220 may determine a network address and/or a web address (e.g., web addresses with which the object communicates), a publisher of the object, a type of the object, an error message, a title text, a dialog box, etc. that the object causes to be displayed, or the like. In some implementations, network security device 220 may open and/or execute the object in a secure, compartmentalized, and/or actively monitored location (e.g., in memory) to minimize impact on network security device 220 that opening and/or executing the object may cause. In this way, network security device 220 may determine object content and/or object metadata by opening and/or executing the object, which may aid network security device 220 in determining object content and/or object metadata from obfuscated and/or encrypted objects and/or in determining network addresses and/or web addresses with which the object communicates.

In some implementations, the object metadata may include a message digest related to the object. A message digest may include a hash value that is generated based on the object. In some implementations, network security device 220 may generate the message digest using a message digest algorithm, such as a Message Digest 5 (MD5) algorithm, a Secure Hash Algorithm, or the like. Network security device 220 may cause one or more Internet searches to be performed based on the object metadata, which may allow network security device 220 to determine information related to the object and associated with the message digest.

As further shown in FIG. 4, process 400 may include causing one or more Internet searches to be performed, based on the object content and/or the object metadata, to determine Internet search results (block 430). For example, network security device 220 may cause one or more Internet searches to be performed, based on the object content and/or the object metadata, to determine Internet search results. In some implementations, network security device 220 may submit the object content and/or object metadata to search engine device 230 (e.g., a search engine device 230 associated with Google, Yahoo, Bing, DuckDuckGo, or the like) for the Internet search. Network security device 220 may cause the one or more Internet searches to be performed to determine Internet search results for analysis. In some implementations, network security device 220 may perform the Internet search locally.

In some implementations, network security device 220 may cause an Internet search to be performed based on a particular string. For example, assume that object content includes a first string, a second string, and a third string. In some implementations, network security device 220 may cause three Internet searches to be performed (e.g., may cause an Internet search to be performed based on each of the three strings). In some implementations, network security device 220 may cause an Internet search to be performed based on a combination of the three strings (e.g., based on the first string and the second string in combination, based on all three strings in combination, etc.).

In some implementations, network security device 220 may determine and/or generate Internet search queries based on the object content and/or the object metadata. For example, network security device 220 may parse the object content and/or the object metadata into strings for use as Internet search queries, may generate keywords as Internet search queries based on the object content and/or the object metadata, or the like. As another example, network security device 220 may generate an Internet search query based on a particular message, title, dialog box, or the like, included in the object content, and/or based on a particular publisher name, object type, object description, or the like, included in the object metadata. In some implementations, network security device 220 may generate Internet search queries based on a combination of the object content and/or the object metadata. For example, network security device 220 may generate an Internet search query that includes information corresponding to a title of the object, a publisher of the object, and/or a version identifier associated with the object. In this way, network security device 220 may generate Internet search queries based on the object content and/or the object metadata, which may improve accuracy of the Internet-based object information.

In some implementations, network security device 220 may cause the Internet search to be performed automatically without user input. For example, based on determining the object content and/or the object metadata, network security device 220 may automatically cause Internet searches to be performed based on the object content and/or the object metadata.

In some implementations, network security device 220 may provide a search query to search engine device 230 for Internet searching. Search engine device 230 may perform an Internet search based on the search query. In some implementations, search engine device 230 may return a list of search results corresponding to Internet documents that have been identified, by search engine device 230, as relevant to the search query. Based on the list of search results, and based on the Internet documents corresponding to the list of search results, network security device 220 or another device may determine Internet-based object information that describes an object associated with the search query.

As further shown in FIG. 4, process 400 may include analyzing the Internet search results to determine Internet-based object information (block 440). For example, network security device 220 may analyze the Internet search results to determine Internet-based object information. The Internet-based object information may describe an origin of the object, a risk rating associated with the object, a suspected type of the object (e.g., a Trojan horse type, a malware type, an adware type, a virus type, a ransomware type, a social media type, a restricted content type, etc.), or other information.

In some implementations, network security device 220 may apply a set of rules to analyze the Internet search results. The set of rules may indicate a conclusion for network security device 220 to determine based on a characteristic of an Internet search result. For example, a first set of top-ranked Internet search results originating from a malware website may indicate that an object associated with the first set of Internet search results is a malware object. As another example, a second set of top-ranked Internet search results originating from a well-known word processor technical support forum may indicate that an object associated with the second set of Internet search results is related to word processing.

In some implementations, the set of rules may prescribe rules to determine a measure of credibility of Internet search results. For example, some Internet search results may be more important than other Internet search results for determining Internet-based object information. The set of rules may prescribe one or more rules to determine which Internet search results are most important for determining Internet-based object information, as described below. In this way, network security device 220 may determine a credibility of Internet search results based on a set of rules, which may improve accuracy and relevance of the Internet-based object information.

In some implementations, the set of rules may determine Internet-based object information and/or a measure of credibility based on an age of an Internet search result. For example, a more recently published Internet search result may indicate that information included in the Internet search result is more current, and may be afforded more credibility by network security device 220. As another example, an old Internet search result may be afforded less credibility by network security device 220 (e.g., based on the information possibly being outdated or inaccurate). In this way, network security device 220 may determine a measure of credibility based on an age of an Internet search result, which may allow network security device 220 to improve accuracy of Internet-based object information for recently created and/or old objects.

In some implementations, the set of rules may determine Internet-based object information based on a measure of popularity of an Internet search result. For example, network security device 220 may assign more credibility to an Internet search result that receives millions of hits per day than to an Internet search result that receives hundreds of hits per day. In this way, network security device 220 may improve accuracy of Internet-based object information by accounting for increased accuracy and/or reliability of a more popular Internet document over a less popular Internet document.

In some implementations, the set of rules may determine Internet-based object information based on a reputation associated with an Internet search result (e.g., based on a reputation score stored by a server, based on other webpages that link to the webpage, or the like). For example, assume that network security device 220 causes an Internet search based on an object and receives an Internet search result of a webpage with a reputation of being associated with malware. Network security device 220 may determine Internet-based object information that indicates that the object is possibly malware (e.g., based on the webpage being associated with malware). As another example, assume that network security device 220 receives an Internet search result of a reputable community support page for a word processor. Network security device 220 may determine Internet-based object information that indicates that that an object associated with the Internet search result is possibly related to word processing, and is possibly not malicious. In this way, network security device 220 may improve accuracy of Internet-based object information by accounting for reputations of Internet search results in order to determine whether the Internet search results are associated with malicious webpages, or the like.

In some implementations, the set of rules may determine Internet-based object information based on a forum discussion within an Internet search result. For example, network security device 220 may evaluate a reputation of the forum, a quantity of responses to the forum discussion, a topic of the forum discussion, content of the forum discussion, or the like. In some implementations, network security device 220 may search for keywords, key phrases, etc., in the forum discussion to determine Internet-based object information based on the forum discussion. In this way, network security device 220 may determine Internet-based object information based on forum discussions, which may allow network security device 220 to determine additional information based on discussions of the object that occur between persons.

In some implementations, network security device 220 may combine multiple criteria to determine Internet-based object information. For example, network security device 220 may determine the Internet-based object information based on a combination of a reputation associated with Internet search results, a measure of popularity of the Internet search results, and/or an age associated with the Internet search results. In some implementations, network security device 220 may determine Internet-based object information based on a weighted combination of criteria. For example, network security device 220 may assign a greater relative weight to a reputation associated with Internet search results, and may assign a lesser relative weight to an age associated with the Internet search results, or vice versa. Network security device 220 may determine Internet-based object information based on the relative weights. In this way, network security device 220 may determine Internet-based object information based on relative weights of different criteria, which may allow network security device 220 to emphasize certain criteria when determining the Internet-based object information.

In some implementations, network security device 220 may determine a classification of the object. For example, network security device 220 may determine Internet-based object information, and may determine a classification based on the Internet-based object information. The classification may indicate that the object is unsafe (e.g., a malware program and/or file, a spyware program and/or file, an adware program and/or file, a virus, etc.), that the object is safe (e.g., a safe program and/or file), a particular category of file (e.g., a social media file, a restricted category of file, a malware file, a file containing sensitive information, etc.), or the like. In some implementations, network security device 220 may determine a probability associated with a classification. For example, network security device 220 may determine a probability that an object is unsafe, safe, belongs to a particular category, or the like, based on Internet-based object information.

In some implementations, network security device 220 may apply a machine learning algorithm to analyze Internet search results. The machine learning algorithm may analyze Internet search results that are based on known objects to generate rules for a predictive model for determining Internet-based object information that describes unknown objects. For example, network security device 220 may provide a set of known malicious and/or non-malicious objects and Internet search results associated with the set of known malicious and/or non-malicious objects. The machine learning algorithm may generate rules for a predictive model based on the set of known malicious and/or non-malicious objects and the Internet search results. The machine learning algorithm may then use the predictive model to determine Internet-based object information for unknown objects, to predict that the unknown object is malicious, to predict that the unknown object is non-malicious, to predict a type of content associated with the unknown object, or the like. The above description of rules related to Internet search results are not intended to be exhaustive of possible implementations. Other rules and/or techniques may be used to determine the Internet-based object information, such as a mathematical analysis technique, a statistical analysis technique, or the like.

As further shown in FIG. 4, process 400 may include storing and/or providing the Internet-based object information (block 450). For example, network security device 220 may store and/or provide the Internet-based object information. In some implementations, network security device 220 may store the Internet-based object information locally. Additionally, or alternatively, network security device 220 may provide the Internet-based object information to another device (e.g., client device 220, a server, a cloud-based storage service, a machine learning device, an analysis device, or the like).

In some implementations, network security device 220 or another device (e.g., a machine learning device, an analysis device, etc.) may determine whether an object is malicious based on the Internet-based object information. For example, network security device 220 may determine a probability that an object is malicious based on Internet-based object information, and may determine whether the object is malicious based on the probability. In some implementations, network security device 220 may provide the Internet-based object information to another device (e.g., a machine learning device, an analysis device, or the like), for the other device to determine whether the object is malicious. In this way, network security device 220 may determine Internet-based object information to determine whether an object is malicious, which may improve accuracy of the determination of whether the object is malicious.

In some implementations, network security device 220 may drop the object based on determining that the object is malicious. For example, network security device 220 may determine that the object is malicious, and may delete the object (e.g., rather than providing the object to a destination of the object). In this way, network security device 220 may drop a malicious object, which may prevent the malicious object from compromising a destination device (e.g., client device 210) and/or providing information from a compromised device to a malicious party.

In some implementations, network security device 220 may quarantine the object based on determining that the object is malicious. For example, network security device 220 may store the object in safe, isolated memory (e.g., for further analysis). By quarantining the object, network security device 220 may allow a network administrator to analyze the object, which may improve network security with respect to malicious objects.

In some implementations, based on determining that the object is malicious, network security device 220 may send a notification to client device 210 in association with the object. For example, network security device 220 may provide a warning to client device 210, indicating that the object may be malicious and to install and/or execute the object at the risk of client device 210. In this way, network security device 220 may ensure that a user of client device 210 is aware of risks associated with executing a potentially malicious object, while still allowing client device 210 to execute the object if the user desires.

In some implementations, network security device 220 may execute the object in a sandbox based on determining that the object is malicious. For example, network security device 220 may execute the object in a secure, compartmentalized, and/or actively monitored location. Network security device 220 may actively monitor the execution of the malicious object, which may provide additional information for network security device 220 to use to detect and control malicious objects.

In some implementations, network security device 220 may add information related to the object to a predictive model based on determining that the object is malicious. For example, network security device 220 may modify rules for a predictive model based on the object (e.g., based on characteristics of the object, based on actions performed by the object when executed, etc.). In this way, network security device 220 may update a predictive model based on determining that an object is malicious, which may improve accuracy of the predictive model in determining whether other objects are malicious.

In some implementations, network security device 220 may add information related to the object to a blacklist based on determining that the object is malicious. For example, network security device 220 may maintain and/or access a blacklist to determine whether objects are malicious. Based on determining that the object is malicious, network security device 220 may add information that describes and/or is related to the object to the blacklist. In this way, network security device 220 may improve coverage of a blacklist based on Internet-based object information, which may improve accuracy of the blacklist for determining whether other objects are malicious.

In some implementations, network security device 220 may notify a network administrator that the object is malicious based on determining that the object is malicious. For example, network security device 220 may provide a message and/or the object to a network administrator based on determining that the object is malicious. This may be useful when the object originates from within the network and/or is frequently encountered by network security device 220. In this way, network security device 220 may notify a network administrator of a malicious object, which may allow the network administrator to take action to warn a user, or the like.

In some implementations, network security device 220 may perform a combination of the above actions based on determining that the object is malicious. For example, network security device 220 may notify a network administrator that an object is malicious, quarantine the object for further analysis, and/or execute the object in a sandbox to perform the further analysis. In some implementations, network security device 220 may perform a combination of the above actions based on a configuration (e.g., a configuration provided by a network administrator, an automatically determined configuration, or the like). In this way, network security device 220 may perform a combination of actions based on a configuration, which may allow, for example, a network administrator to customize protection offered by network security device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of determining Internet-based object information based on object content and/or object metadata.

Figure 5A:
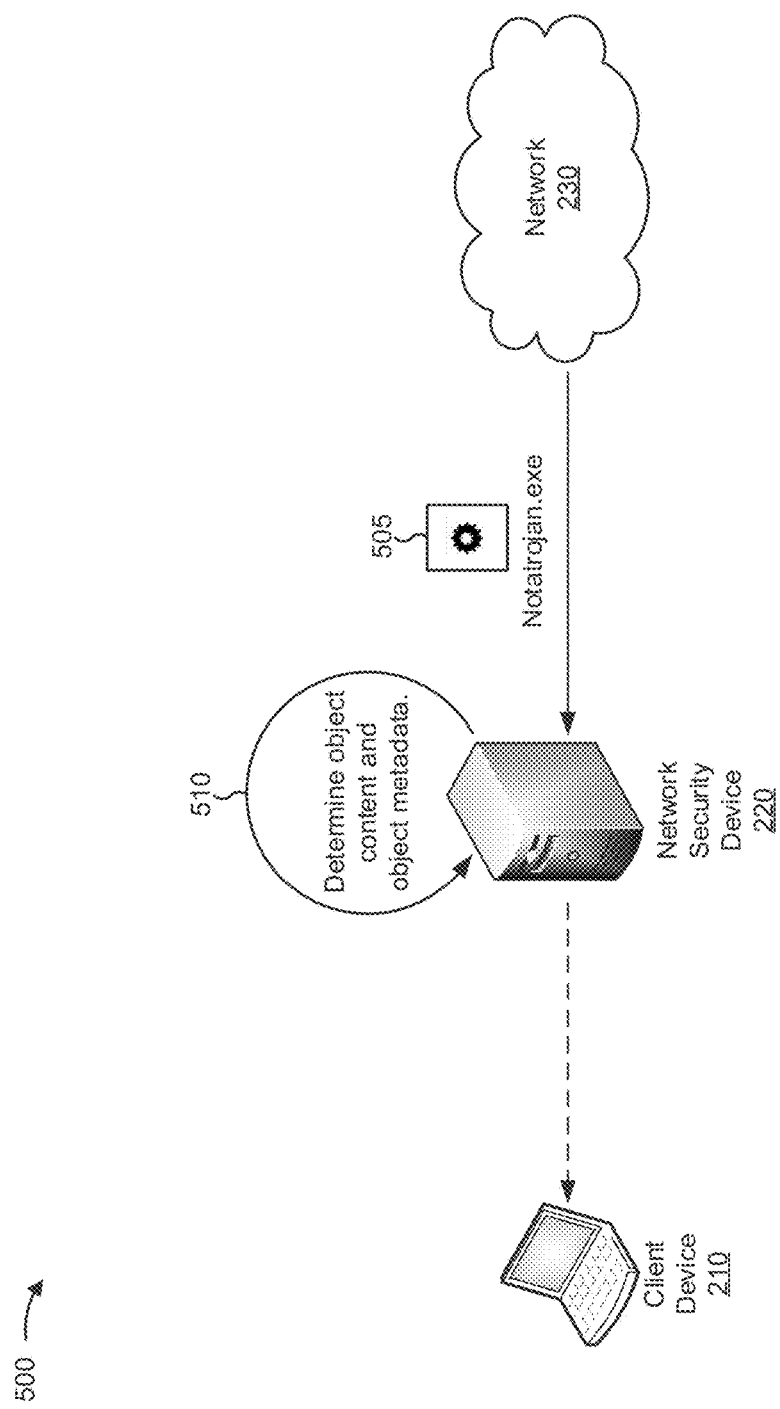
FIGS. 5A-5D are diagrams of an example implementation relating to the example process shown in FIG. 4.

As shown in FIG. 5A, and reference number 505, network security device 220 may receive an object (e.g., shown as Notatrojan.exe). Assume that network security device 220 receives the object en route to client device 210 (e.g., as indicated by the dotted arrow). As shown by reference number 510, network security device 220 may determine object information for the object (e.g., object content, object metadata, or the like).

Figure 5B:
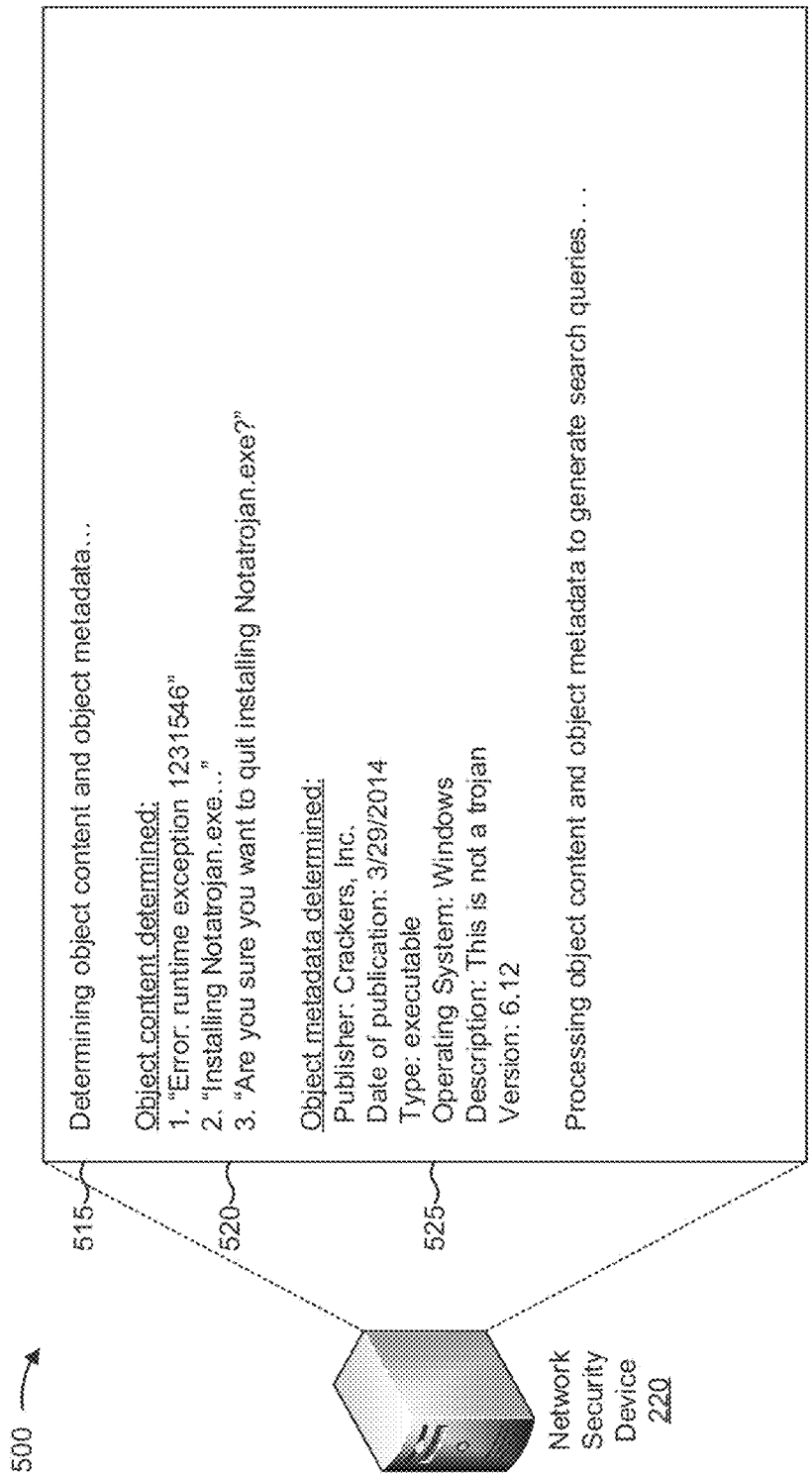

As shown in FIG. 5B, and by reference number 515, network security device 220 may determine object content and object metadata for the executable object. Assume that network security device 220 performs a static analysis to determine the object content and the object metadata from the executable object. Additionally, or alternatively, network security device 220 may execute the executable object to determine the object content and the object metadata. As shown by reference number 520, network security device 220 may successfully determine the object content (e.g., shown as a first string of "Error: runtime exception 1231546," a second string of "Installing Notatrojan.exe," and a third string of "Are you sure you want to quit installing Notatrojan.exe?").

As shown by reference number 525, network security device 220 may determine object metadata for the executable object. Here, network security device 220 determines object metadata that identifies a publisher (e.g., Crackers, Inc.), a date of publication (e.g., Mar. 29, 2014), an object type (e.g., executable), an operating system (e.g., Windows), an object description (e.g., "This is not a trojan"), and an object version (e.g., version 6.12). As further shown, assume that network security device 220 processes the object content the object metadata to generate search queries.

Figure 5C:
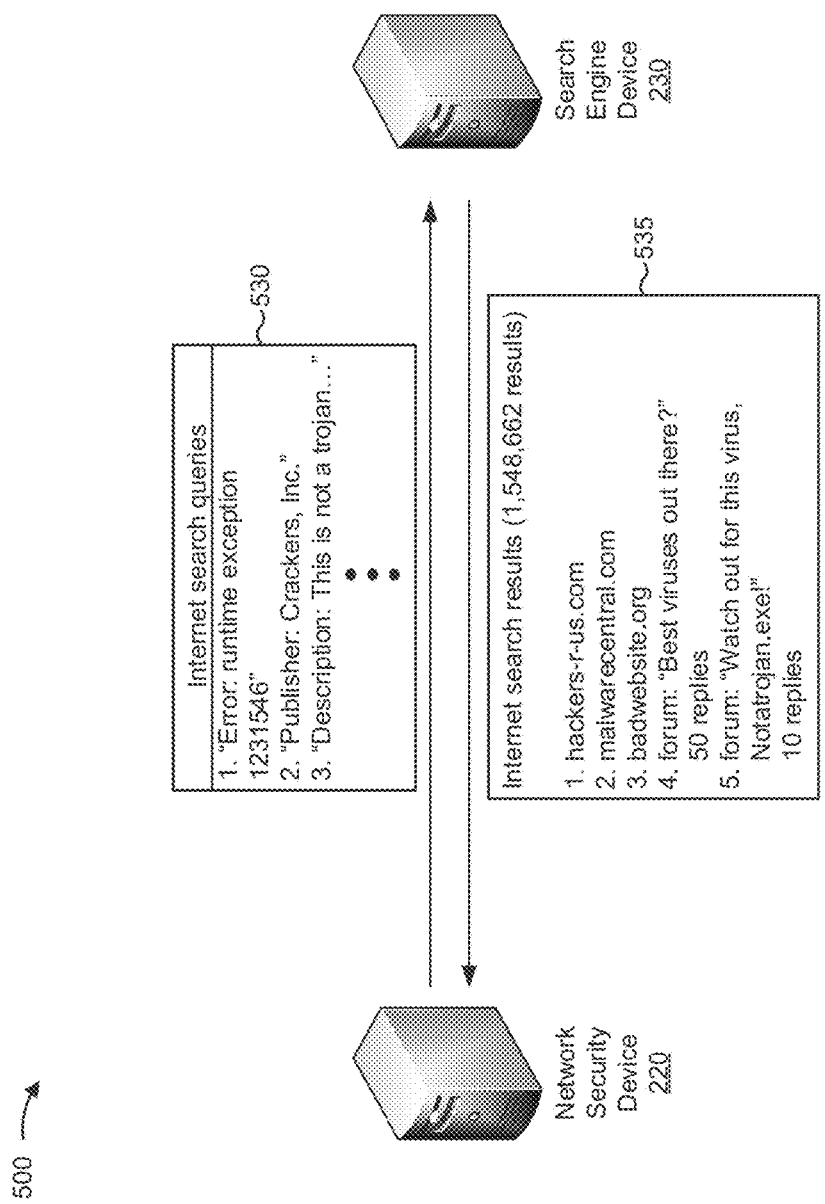

As shown in FIG. 5C, and by reference number 530, network security device 220 may provide the object content and the object metadata (or keywords generated based on the object content and the object metadata) to an Internet search engine (e.g., search engine device 230) as search queries. Assume that the Internet search engine receives the search queries and performs Internet searches based on each of the search queries. As shown by reference number 535, network security device 220 may receive Internet search results based on the Internet search queries. As shown, the Internet search results may include links to webpages (e.g., hackers-r-us.com, malwarecentral.com, badwebsite.org, etc.) and/or links to forum conversations (e.g., "Best viruses out there?" and an indication of fifty replies to the conversation, and "Watch out for this virus, Notatrojan.exe!" and an indication of ten replies).

Figure 5D:
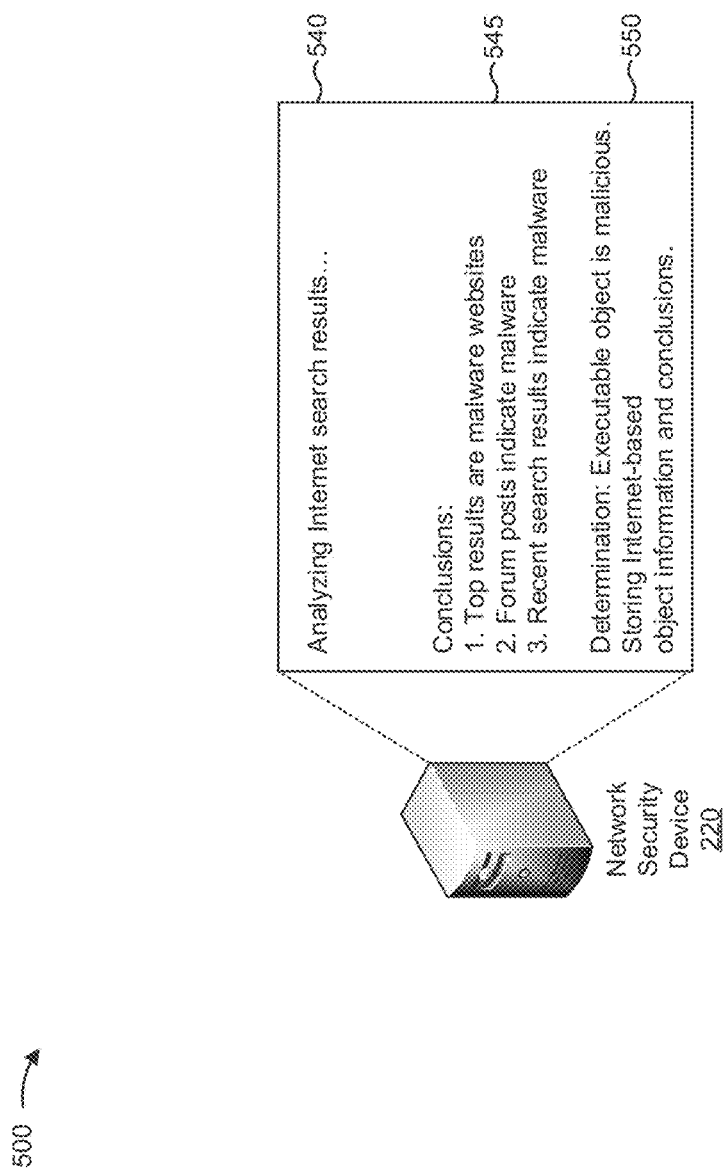

As shown in FIG. 5D, and by reference number 540, network security device 220 may analyze the Internet search results. Assume that network security device 220 analyzes the Internet search results based on a set of rules to determine conclusions related to the executable object. As shown by reference number 545, network security device 220 may determine a set of conclusions related to the Internet search results and the executable object (e.g., may determine that the top Internet search results are malware websites, may determine that forum posts related to the executable object indicate that the executable object is malware, and may determine that recently created Internet search results indicate that the executable is malware). As shown by reference number 550, network security device 220 may determine that the executable object is malicious. Assume that network security device 220 determines that the executable object is malicious based on the conclusions and based on the Internet-based object information. As further shown, network security device 220 may store the Internet-based object information and the conclusions. In some implementations, network security device 220 may perform one or more remedial actions based on determining that the executable object is malicious.

As indicated above, FIGS. 5A-5D are provided merely as an example. Other examples are possible and may differ from what was described with regard to FIGS. 5A-5D.

In this way, the network security device may compile Internet search results based on object content and object metadata. The Internet search results may provide information that may be unavailable in private databases due to age, obscurity, or another reason. The network security device may analyze the Internet search results to determine Internet-based object information, which may aid the network security device and/or a network provider that provides the network security device in classifying and/or monitoring an object.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory storing instructions; and
   one or more processors, communicably connected to the memory, to:
   intercept an object that is en route, over a network, to a client device;
   execute the object to determine first object information for the object, the first object information including object content and object metadata;
   parse the first object information into one or more strings;
   cause an Internet search, based on a string of the one or more strings, to be performed to determine Internet search results,
      the string being provided as one or more Internet search queries for the Internet search;
   receive the Internet search results based on causing the Internet search to be performed,
      the Internet search results being related to the first object information;
   perform analysis of the Internet search results, based on a set of rules, to determine a set of conclusions,
      the set of rules including a measure of credibility of the Internet search results, and
      the set of conclusions including at least one of:
         a first conclusion of whether a top Internet search result is a malware website,
         a second conclusion of whether a forum post indicates that the object is malware, or
         a third conclusion of whether a particular Internet search result indicates that the object is malware;
   store or provide the set of conclusions to permit a determination as to whether the object is malicious; and
   modify a predictive model based on the determination as to whether the object is malicious,
      the predictive model being used for determining second object information for unknown objects.

2. The device of claim 1, where the one or more processors, when parsing the first object information into the one or more strings, are to:
   parse the object content into the string.

3. The device of claim 1, where the one or more processors, when parsing the first object information into the one or more strings, are to:
   parse the object metadata into the string.

4. The device of claim 1, where the one or more processors are further to:
   perform a static analysis to determine third object information,
      the third object information being determined without opening or executing the object.

5. The device of claim 1, where the one or more processors are further to:
   determine a classification of the object based on the set of conclusions,
      the classification indicating whether the object is safe or unsafe.

6. The device of claim 1, where the predictive model is generated by applying a machine learning algorithm to a known object and known Internet search results associated with the known object; and
   where the one or more processors, when performing the analysis of the Internet search results, are to:
      perform the analysis of the Internet search results associated with the object based on the predictive model to determine the set of conclusions.

7. The device of claim 1, where the one or more processors are further to:
   notify a network administrator based on the determination as to whether the object is malicious.

8. A non-transitory computer-readable medium storing instructions, the instructions comprising:
   one or more instructions that, when executed by one or more processors, cause the one or more processors to:
      intercept an object that is en route, over a network, to a client device,
         first object content being included in the object;
      execute the object to determine the first object content for the object;
      parse the first object content into a string;
      process the string to generate a plurality of Internet search queries;
      submit the plurality of Internet search queries to a search engine device;
      receive, from the search engine device, a plurality of Internet search results based on the plurality of Internet search queries;
      perform analysis of the plurality of Internet search results, based on a set of rules, to determine a set of conclusions,
         the set of rules including a measure of credibility of the Internet search results, and
         the set of conclusions including at least one of:
            a first conclusion of whether a top Internet search result is a malware web site,
            a second conclusion of whether a forum post indicates that the object is malware, or a third conclusion of whether a particular Internet search result indicates that the object is malware;
store or provide the set of conclusions to permit a determination as to whether the object is malicious;
add information, describing the object, to a blacklist based on the determination as to whether object is malicious; and
modify a predictive model based on the determination as to whether the object is malicious,
the predictive model being used for determining second object content for unknown objects.

9. The non-transitory computer-readable medium of claim 8, where the one or more instructions, when executed by the one or more processors, further cause the one or more processors to:
determine a classification of the object based on the set of conclusions,
the classification indicating whether the object is malicious.

10. The non-transitory computer-readable medium of claim 8, where the information is first information;
where the one or more instructions, when executed by the one or more processors, further cause the one or more processors to:
determine object metadata for the object,
the object metadata including second information describing the object; and
process the object metadata to obtain one or more Internet search queries; and
where the one or more instructions, that cause the one or more processors to submit the plurality of Internet search queries, cause the one or more processors to:
submit the one or more Internet search queries to the search engine device.

11. The non-transitory computer-readable medium of claim 8, where the one or more instructions, when executed by the one or more processors, further cause the one or more processors to:
perform a static analysis to determine second object content,
the second object content being determined without opening or executing the object.

12. The non-transitory computer-readable medium of claim 8, where the one or more instructions, that cause the one or more processors to execute the object, cause the one or more processors to:
execute the object to determine object metadata for the object; and
where the one or more instructions, when executed by the one or more processors, further cause the one or more processors to:
process the object metadata to obtain one or more Internet search queries.

13. The non-transitory computer-readable medium of claim 8, where the one or more instructions, that cause the one or more processors to analyze the plurality of Internet search results, cause the one or more processors to:
analyze the plurality of Internet search results based on at least one of:
a date of publication associated with the plurality of Internet search results,
a quantity of page views associated with the plurality of Internet search results,
a ranking associated with the plurality of Internet search results, or
a reputation associated with the plurality of Internet search results.

14. The non-transitory computer-readable medium of claim 8, where the predictive model is generated by applying a machine learning algorithm to a known object and known Internet search results associated with the known object; and
where the one or more instructions, that cause the one or more processors to perform the analysis of the plurality of Internet search results, cause the one or more processors to:
perform the analysis of the plurality of Internet search results based on the predictive model to determine the set of conclusions.

15. A method, comprising:
intercepting, by a device, an object that is en route, over a network, to a client device;
executing, by the device, the object to determine first object information,
the first object information being included in or describing the object;
parsing, by the device, the first object information into a string;
generating, by the device, Internet search queries based on the string;
causing, by the device and based on the Internet search queries, an Internet search to be performed to determine Internet search results;
performing, by the device, analysis of the Internet search results, based on a set of rules, to determine a set of conclusions,
the set of rules including a measure of credibility of the Internet search results, and
the set of conclusions including at least one of:
a first conclusion of whether a top Internet search result is a malware web site,
a second conclusion of whether a forum post indicates that the object is malware, or
a third conclusion of whether a particular Internet search result indicates that the object is malware;
determining, by the device and based on the set of conclusions, whether the object is malicious;
modifying, by the device, a predictive model based on the determination as to whether the object is malicious,
the predictive model being used for determining second object information for unknown objects; and
adding, by the device, third object information, describing the object, to a blacklist based on the determination as to whether object is malicious.

16. The method of claim 15, further comprising:
determining object metadata for the object,
the object metadata including information describing the object; and
where causing the Internet search to be performed comprises:
causing the Internet search to be performed based on the object metadata.

17. The method of claim 15, where the predictive model is generated by applying a machine learning algorithm to a known object and known Internet search results associated with the known object; and
where performing the analysis of the Internet search results comprises:
performing the analysis of the Internet search results based on the predictive model to determine the set of conclusions.

18. The method of claim 15, further comprising:
performing a static analysis to determine the first object information,
the static analysis determining the first object information without opening or executing the object.

19. The method of claim 15, where the first object information comprises:
object content and object metadata for the object,
the object content being included in the object, and
the object metadata describing the object; and
where generating the Internet search queries comprises:
generating the Internet search queries based on the object content and based on the object metadata.

20. The method of claim 15, further comprising:
dropping the object based on determining that the object is malicious.

\* \* \* \* \*